US009148650B2

(12) United States Patent
Chandraker et al.

(10) Patent No.: US 9,148,650 B2
(45) Date of Patent: Sep. 29, 2015

(54) REAL-TIME MONOCULAR VISUAL ODOMETRY

(71) Applicant: NEC Laboratories America, Inc., Princeton, NJ (US)

(72) Inventors: Manmohan Chandraker, Santa Clara, CA (US); Shiyu Song, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 332 days.

(21) Appl. No.: 13/858,040

(22) Filed: Apr. 6, 2013

(65) Prior Publication Data

US 2014/0078258 A1      Mar. 20, 2014

Related U.S. Application Data

(60) Provisional application No. 61/725,733, filed on Nov. 13, 2012, provisional application No. 61/701,877, filed on Sep. 17, 2012.

(51) Int. Cl.
*H04N 13/02*   (2006.01)
*G06K 9/00*    (2006.01)
*G06T 7/00*    (2006.01)

(52) U.S. Cl.
CPC .......... *H04N 13/0203* (2013.01); *G06T 7/0044* (2013.01); *G06T 7/0071* (2013.01); *H04N 13/02* (2013.01); *G06T 2207/30244* (2013.01); *G06T 2207/30252* (2013.01)

(58) Field of Classification Search
USPC ........................................................... 348/46
See application file for complete search history.

(56) References Cited

U.S. PATENT DOCUMENTS

| | | | |
|---|---|---|---|
| 6,442,476 B1 * | 8/2002 | Poropat ........................... | 701/23 |
| 8,259,994 B1 * | 9/2012 | Anguelov et al. ............. | 382/100 |
| 8,761,439 B1 * | 6/2014 | Kumar et al. ................. | 382/103 |
| 2008/0089556 A1 * | 4/2008 | Salgian et al. ................ | 382/103 |
| 2010/0166294 A1 * | 7/2010 | Marrion et al. ............... | 382/154 |

OTHER PUBLICATIONS

Tardif et al., "Monocular Visual Odometry in Urban Environments Using an Omnidirectional Camera"; Sep. 22-26, 2008; Intelligent Robots and Systems, 2008. IROS 2008. IEEE/RSJ International Conference on, 2531-2538.*

Scaramuzza et al., "Appearance-Guided Monocular Omnidirectional Visual Odometry for Outdoor Ground Vehicles", Sep. 16, 2008; Robotics, IEEE Transactions on; vol. 24 , Issue 5; 1015-1026.*

Nistér et al., "Visual Odometry for Ground Vehicle Applications"; Jan. 26, 2006; Journal of Field Robotics; vol. 23, 1-35.*

Scaramuzza, "1-Point-RANSAC Structure from Motion for Vehicle-Mounted Cameras by Exploiting Non-holonomic Constraints"; Apr. 7, 2011; International Journal of Computer Vision; vol. 95, Issue 1; 74-85.*

* cited by examiner

*Primary Examiner* — Jamie Atala
*Assistant Examiner* — Patrick Demosky
(74) *Attorney, Agent, or Firm* — Joseph Kolodka

(57) ABSTRACT

Systems and methods are disclosed for multithreaded visual odometry by acquired with a single camera on-board a vehicle; using 2D-3D correspondences for continuous pose estimation; and combining the pose estimation with 2D-2D epipolar search to replenish 3D points.

20 Claims, 9 Drawing Sheets

Pose Module

The pose module has the following functions:

(a) Detection:
  (i) detect features (we use FAST corners, minimum 500 and maximum 1000 are extracted)
  (ii) compute ORB descriptors (b) Pose-guided Matching (PGM):
  (i) predict the pose based on the previous frame's velocity
  (ii) project the stable set of 3D points into the current frame using the motion model and compare the ORB descriptors in a small circle of radius $r\_s$ (= 20 pixels)

(c) Pose Estimation (PnP):
  (i) use PnP algorithm to compute the camera pose in a robust RANSAC framework
  (ii) perform nonlinear refinement to optimize the pose.

FIG. 3

Local Bundle Adjustment Module

LBA: Refine 3D points and camera poses in a sliding window of $N\_b = 10$ frames.

Data structure: frame cache
  Stores feature locations, descriptors, camera poses of most recent $N\_b$ frames Novel data structure: match cache
  List of tables, one element of list corresponding to each frame
  Key into table is identity of 3D point, stored entry is identity of 2D feature.
  Allows fast access to insert or delete 3D points in the map.

R: Re-find 3D points that are lost due to tracking errors
  Pose highly accurate after LBA, so search for projected match in tight radius of $r\_f = 10$ pixels.

U\_MM: Update the motion model to perform PGM in the next frame.

FIG. 5

Firewall 302

Solves the problem of scale drift.
Assume locally planar road surface and compute height of camera above it, h.
Scale with a factor h0/h, where h0 is the known true height of camera.

Method 1 to find h:
  Triangulate 3D points on the ground
  Use 3-point RANSAC to find the best-fit plane
  Compute height of camera from computed plane, call it h1. Scale factor s1 = h0/h1.

Method 2 to find h:
  Match features on the road between current frame and previous frame.
  Since road is locally planar, find the best-fit planar homography between two sets of points
  4-point RANSAC to optimize an algebraic model
  Levenberg-Marquardt optimization to minimize optimal reprojection error:

$$\min_{H} \sum \|x_i' - Hx_i\|^2 + \|x_i - H^{-1} x_i'\|^2$$

Decompose homography into its constituent geometric elements: rotation R, translation t, plane normal n, plane height h2:

$$H = R + \frac{1}{h_2} t\, n^T$$

Compute scale factor s2 = h0/h2.

If s1 and s2 mutually agree (that is, are within 5% of each other), compute s = mean(s1, s2).
If abs(s - 1) > 0.1, poll for scale correction.
If previous mutually agreed scale is within 5% of s, correct scale by factor s.
Else, wait for next mutually agreed scale factor to confirm s.

Once scale is corrected, insert a firewall.
Adjust scale of bundle cache, fix the frames (poses and 3D points) outside the bundle cache

FIG. 9

REAL-TIME MONOCULAR VISUAL ODOMETRY

This application is a non-provisional of and claims priority to Provisional Application Ser. No. 61/701,877 filed on Sep. 17, 2012 and Ser. No. 61/725,733 filed on Nov. 13, 2012, the content of which is incorporated by reference.

BACKGROUND

The present invention relates to visual odometry.

In navigation, odometry is the use of data from the movement of actuators to estimate change in position over time through devices such as rotary encoders to measure wheel rotations. Visual odometry is the process of determining equivalent odometry information using sequential camera images to estimate the distance traveled. Visual odometry for real-world autonomous outdoor driving has gained interest for vehicular navigation purposes. While stereo Simultaneous Localization And Mapping (SLAM) systems routinely achieve high accuracy and real-time performance, the challenge remains daunting for monocular ones. Yet, monocular systems are attractive for the automobile industry since they are cheaper and the calibration effort is lower. Costs of consumer cameras have steadily declined in recent years, but cameras for practical visual odometry in automobiles are expensive since they are produced in lesser volume, must support high frame rates and be robust to extreme temperatures, weather and jitters.

The challenges of monocular visual odometry for autonomous driving are both fundamental and practical. For instance, it has been observed empirically and theoretically that forward motion with epipoles within the image is a "high error" situation for SFM. Vehicle speeds in outdoor environments can be high, so even with cameras that capture imagery at high frame rates, large motions may occur between consecutive frames. This places severe demands on an autonomous driving visual odometry system, necessitating extensive validation and refinement mechanisms that conventional systems do not require. The timing requirements for visual odometry in autonomous driving are equally stringent—a pose must be output at every frame in a fixed amount of time. For instance, traditional systems may produce a spike in timings when keyframes are added, or loop closure is performed.

SUMMARY

In one aspect, systems and methods are disclosed for multithreaded visual odometry by acquired with a single camera on-board a vehicle; using 2D-3D correspondences for continuous pose estimation; and combining the pose estimation with 2D-2D epipolar search to replenish 3D points.

Advantages of the above aspect may include one or more of the following. The system makes judicious use of a novel multithreaded design to ensure that motion estimates (and the underlying structure variables) become available only after extensive validation with long-range constraints and thorough bundle adjustments, but without delay. Thus, the system is optimized for worst-case timing scenarios, rather than the average-case optimization for most traditional systems. In particular, the multithreaded system produces pose outputs in at most 50 ms, regardless of whether a keyframe is added or scale correction performed. The average frame rate of the system is much higher, at above 30 fps.

The system provides a real-time, accurate, large-scale monocular visual odometry system for real-world autonomous outdoor driving applications. The architecture of the system addresses the challenge of robust multithreading even for scenes with large motions and rapidly changing imagery. The design is extensible for three or more parallel CPU threads. The system uses 3D-2D correspondences for robust pose estimation across all threads, followed by local bundle adjustment in the primary thread. In contrast to prior work, epipolar search operates in parallel in other threads to generate new 3D points at every frame. This significantly boosts robustness and accuracy, since only extensively validated 3D points with long tracks are inserted at keyframes. Fast-moving vehicles also necessitate immediate global bundle adjustment, which is triggered by the instant keyframe design in parallel with pose estimation in a thread-safe architecture. To handle inevitable tracking failures, a recovery method is provided. Scale drift is corrected using a mechanism that detects (rather than assumes) local planarity of the road by combining information from triangulated 3D points and the inter-image planar homography. The system is optimized to output pose within 50 ms in the worst case, while average case operation is over 30 fps. Evaluations are presented on the challenging KITTI dataset for autonomous driving, where the system achieves better rotation and translation accuracy than other systems.

BRIEF DESCRIPTION OF THE DRAWINGS

FIG. 3 shows an exemplary epipolar constrained search.

FIG. 5 shows an exemplary multithreaded keyframe architecture to handle insertion of new 3D points in the main thread.

FIG. 9 shows an exemplary scale correcting system that combines scale estimates from 3D points and planar homography mappings.

DESCRIPTION

Visual odometry is an inherently sequential operation. This is especially true for autonomous navigation as opposed to indoor or desktop applications, where the possibility of repeatedly viewing the same scene structures is high. For rapidly changing points in the visible field of view, bundle adjustment must be per-frame rather than with the interrupt mechanism of PTAM, else by the time the refined points become available, they are not useful any more. Thus, designing a multithreaded system requires achieving a delicate balance between accuracy and latency.

Figure 1:
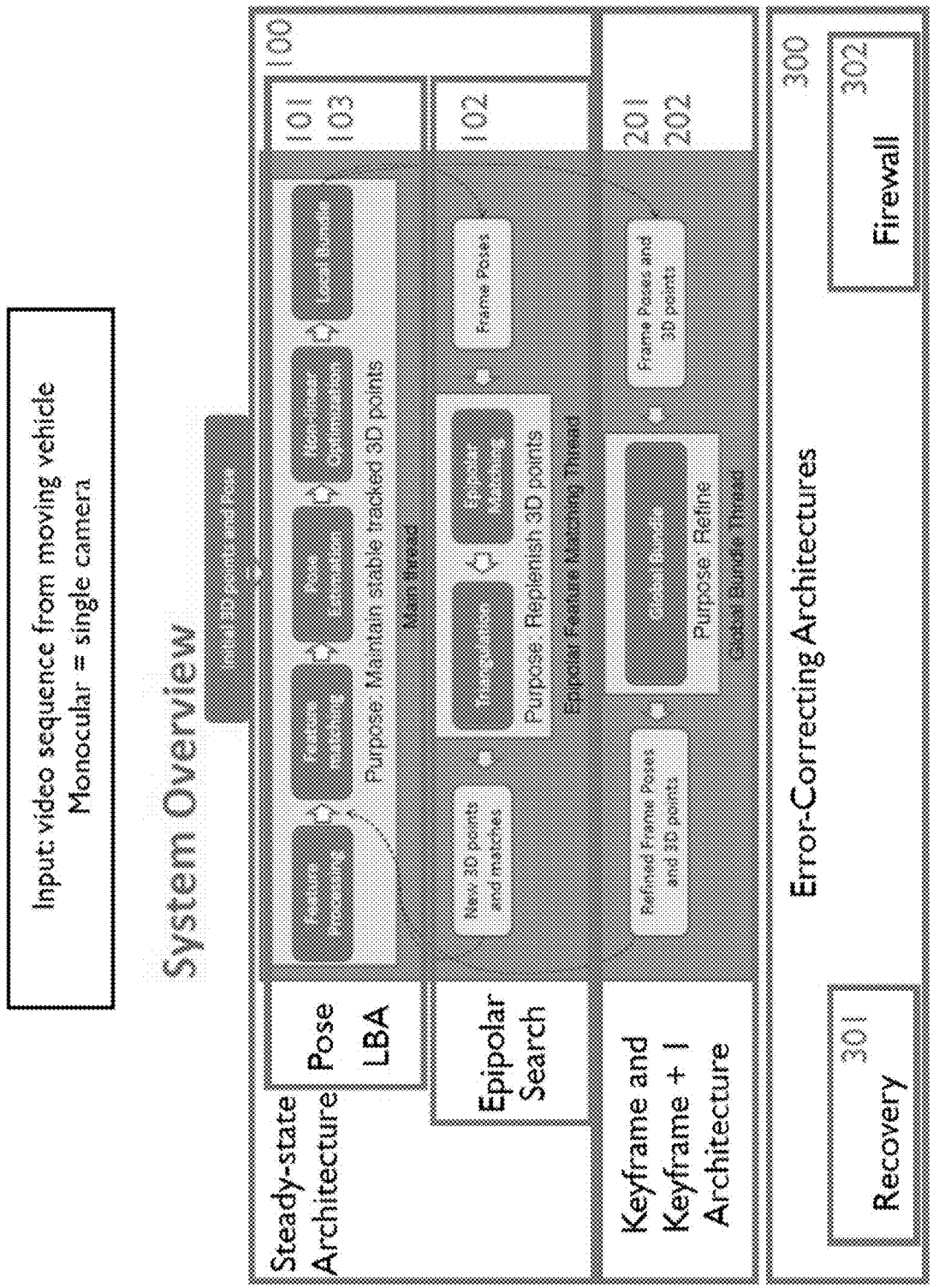
FIG. 1 shows an exemplary multithreaded architecture with 2D-3D correspondences for continuous pose estimation.

FIG. 1 shows an exemplary multithreaded architecture with 2D-3D correspondences for continuous pose estimation. One embodiment is a multithreaded structure-from-motion (SFM) architecture 100. The steady-state architecture 100 includes a pose local bundle adjustment (LBA) system 101/103 and an epipolar search unit 102. The multithreaded architecture uses 2D-3D correspondences for continuous pose estimation in 101/103. This is combined with 2D-2D epipolar search to replenish 3D points. This architecture allows camera pose estimation and 3D reconstruction using fast moving imagery acquired with a single camera on-board a vehicle, thereby enabling autonomous driving applications.

The output of the pose LBA is provided to a keyframe and keyframe+1 unit 201/202. Unit 201 provides a collection and refinding mechanism allows bundle adjustment using long tracks, as opposed to two-view estimations for previous works, while unit 202 handles the keyframe+1 where real-time global bundle adjustment is conducted in a thread-safe architecture with real-time pose estimation.

The unit tales frame poses and 3D points and performs refinement on a global bundle to generate refined frame poses and 3D points that are provided to the feature matching engine of the pose LBA unit 101/103. In parallel, an error-correcting unit 300 provides error recovery 301 and firewall 302, as discussed in more details below.

The multithreaded architecture allows elegant extension to as many threads as desired. Besides speed advantages, multithreading also greatly contributes to the accuracy and robustness of the system. As an example, consider the epipolar contrained search. A single-thread version of a system that relies on 2D-3D correspondences might update its stable point set by performing an epipolar search in the frame preceding a keyframe. However, the support for the 3D points introduced by this mechanism is limited to just the triplet used for the circular matching and triangulation. By moving the epipolar search to a separate thread and performing the circular matching at every frame, the system may supply 3D points with tracks of length up to the distance from the preceding keyframe. Clearly, the set of long tracks provided by the epipolar thread in the multithread system is far more likely to be free of outliers.

Figure 2:
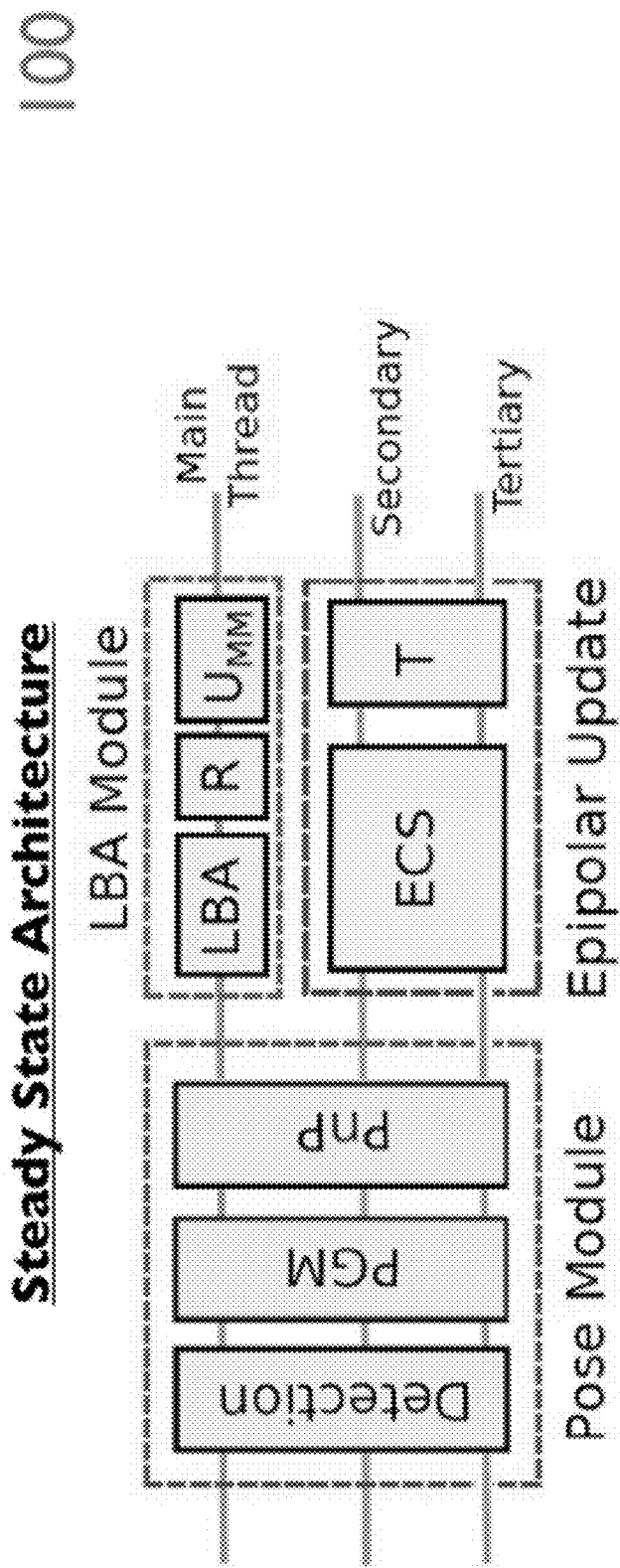
FIG. 2 shows an exemplary pose-guided matching module to provide fast 3D-2D correspondences.

FIG. 2 shows one exemplary pose-guided matching module 100 (FIG. 1) to provide fast 3D-2D correspondences. At steady state, the system has access to a stable set of 3D points. The poses of the previous frames have undergone multiple non-linear optimizations and are considered accurate. Each frame is processed by three modules: the pose module estimates the pose of the current frame and occupies all available threads; 2) the epipolar update module uses epipolar constrained search (ECS) and triangulation T to prepare new 3d points to be added; and 3) the local bundle adjustment (LBA) unit performs non-linear optimization over a sliding window of a few previous frames and takes place in the main thread.

Pose-guided matching with fast 3D-2D correspondences is supported by the architecture of FIG. 2 for every steady state frame. The modules are depicted in their multithreading arrangement, in correct synchronization order but not to scale. Camera images are provided to a detection module, then provided to a PGM unit for pose-guided matching, and then to a perspective n-point (PnP) pose estimation unit. The outputs of the PnP unit are provided to the LBA unit, then to a finding unit R and an update motion model U. The output of the PnP unit are also provided to an ECS unit for epipolar constrained search and then to a triangulation unit T.

To initialize, the system extracts FAST corners with ORB descriptors and matches between consecutive frames using locality sensitive hashing (LSH). With sufficient baseline (around 5 frames), a set of 3D points is initialized by relative pose estimation, triangulation and bundle adjustment. Each frame during initialization is processed within 10 ms.

At steady state, the system has access to a stable set of at least $N_s$ 3D points that have undergone extensive bundle adjustment in prior frames (in one implementation $N_s=100$). The preceding poses have also undergone multiple non-linear refinements, so can be considered highly accurate. The system architecture at every frame in steady state operation is illustrated in FIG. 1.

Around 2000 FAST corners with Shi-Tomasi filtering are extracted from a typical outdoors image and ORB descriptors are computed. Using the pose of the previous frame, the pose of the current frame is predicted, assuming constant velocity. The system explicitly computes the camera pose at each frame using correspondences, the motion model is only used as guidance to expedite matching. The existing set of stable 3D points are projected into the image using the predicted pose and the ORB descriptor for each is compared to those within a square of side $2r_s$ pixels (for example $r_s=15$). Given these 2D-3D point correspondences, the system computes the actual camera pose using perspective n-point (PnP) pose estimation in a RANSAC framework. The particular implementation used is EPnP with a model size of 4 points. The RANSAC pose with the largest consensus set is refined using a Levenberg-Marquardt nonlinear optimization.

The system can easily handle other choices for matching, in particular, the system has achieved similar results using normalized cross-correlation (NCC) instead of ORB. But associating a descriptor like ORB with a 3D point can have ancillary benefits, as observed in the following sections.

Feature and descriptor extraction, pose-guided matching and pose estimation are all easily parallelizable across multiple threads, using a shared memory multiprocessing platform such as OpenMP. Across three threads, the timings for various components of the pose module are summarized in Table 1 below:

TABLE 1

| FAST corner detection + Shi-Tomasi | 1 ms |
| --- | --- |
| ORB descriptor extraction | 5 ms |
| Pose-guided matching | 1 ms |
| PnP (RANSAC, 500 iterations) | 15 ms |
| Nonlinear pose refinement | 1 ms |

The pose module 101 is shown in FIG. 3. As shown in FIG. 3, the pose module has the following functions: detection of features and ORB descriptors; pose-guided matching (PGM); and pose estimation (PnP).

If the application scenario involves scenes where the same set of 3D points is viewed for extended periods of time, then the pose module by itself would be sufficient to maintain the camera pose. However, in outdoor applications like autonomous navigation, 3D scene points rapidly move out of view within a few frames. Thus, the stable set of points used for pose computation must be continually updated, which is the task entrusted to the epipolar search module 102 of FIG. 1.

Figure 4:
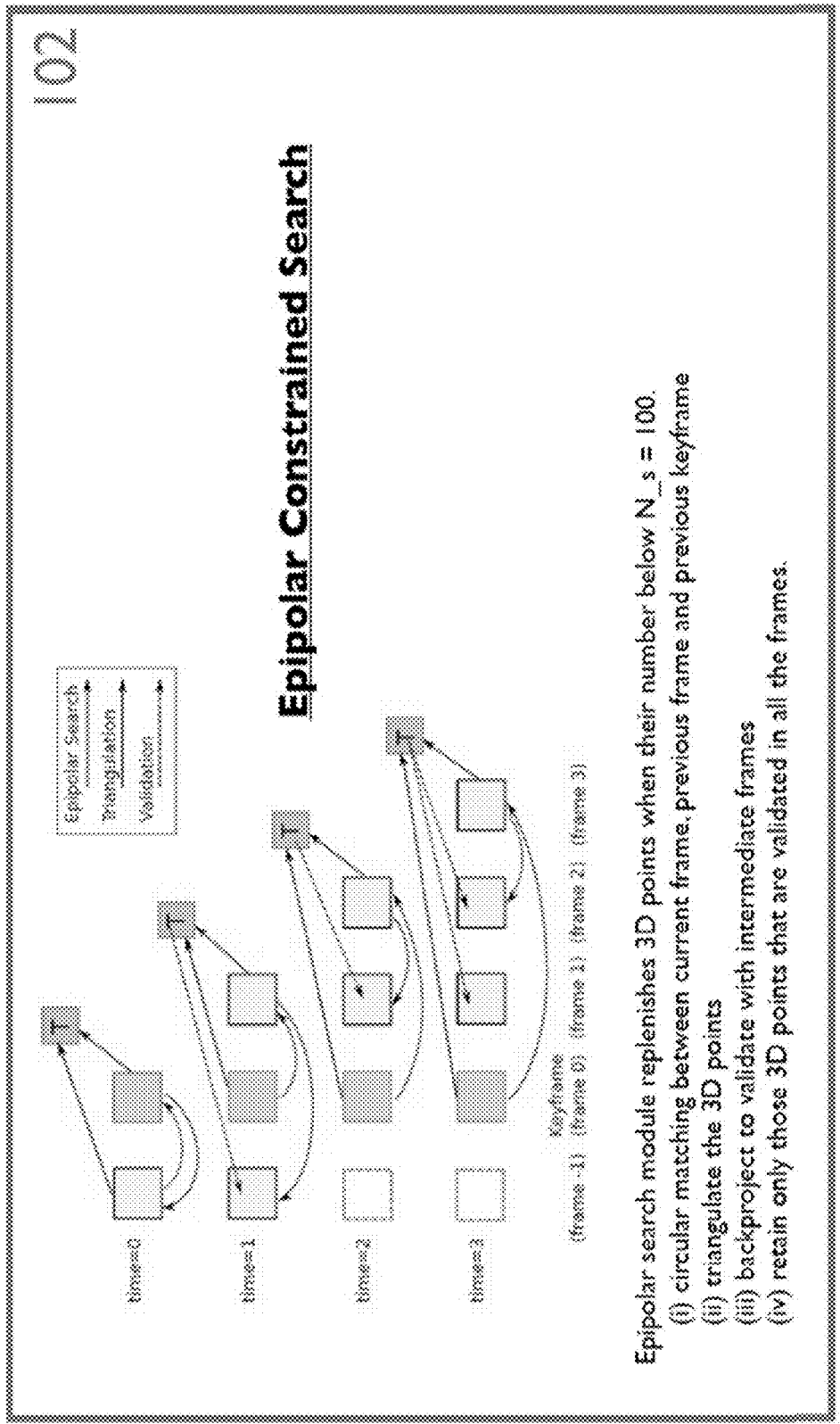
FIG. 4 shows an exemplary local bundle module.

FIG. 4 shows in more details the epipolar constrained search module 102. As depicted in FIG. 4, the epipolar search module is parallelized across two threads and follows pose estimation at each frame. The mechanism for epipolar search is illustrated in FIG. 2. Let the most recent prior keyframe be frame 0. After pose computation at frame n, for every feature $f_0$ in the keyframe at location $(x_0, y_0)$, the system considers a square of side $2r_e$ centered at $(x_0, y_0)$ in frame n. The system considers the intersection region of this square with a rectilinear band p pixels wide, centered around the epipolar line corresponding to $f_0$ in frame n. The ORB descriptors for all FAST corners that lie within this intersection region are compared to the descriptor for $f_0$. The closest match, $f_n$, is found in terms of Hamming distance. This epipolar matching procedure is also repeated by computing the closest match to $f_n$ in frame n−1, call it $f_{n-1}$. A match is accepted only if $f_{n-1}$ also matches $f_0$. Note that only two sets of matches with respect to frames (0, n) and (n−1, n) must be computed at the frame n, since the matches between (0, n−1) have already been computed at frame n−1.

In one embodiment, the parameter $r_e$ is automatically determined by the size of the motion, the system uses $r_e = \min\{1200\|\omega\|^2, 10\}$, where $\omega$ is the differential rotation between frames n−1 and n. Since pose estimates are highly accurate due to continuous refinement by bundle adjustment, epipolar lines are deemed accurate and a stringent value of p=3 can be used to impose the epipolar constraint. The Hamming distance computation for 256-bit ORB descriptors in a region of interest is performed as a block, with a fast SSE implementation. To rapidly search for features that lie within the above region of interest, the detected features in an image are stored in a lookup table data structure. The key into the table is the column index of the feature and within each bucket, features are stored in sorted row order. Across two threads, this allows circular matching for a triplet of images, with up to 500 features in each, in 10-15 ms. As opposed to brute-force searching, the lookup table results in speedups by up to a factor of 10, especially in the autonomous driving application where the images traditionally have wide aspect ratios (to cover greater field of view while limiting uninformative regions like sky).

The features that are circularly matched in frame n are triangulated with respect to the most recent keyframe (frame 0). This two-view triangulation requires approximately 2 ms per frame. The reconstructed 3D point is back-projected in all the frames 1, . . . , n−1 and is retained only if a matching ORB descriptor is found within a very tight square of side $2r_b$ pixels (set $r_b$=3). This acts as a replacement for a more accurate, but expensive, multiview triangulation and is satisfactory since epipolar search produces a large number of 3D points, but only the most reliable ones may be used for pose estimation. However, these 3D points are not added to the stable point cloud yet. For that they must first undergo a local bundle adjustment and be collected by the main thread at a keyframe, which are aspects explained in the following sections.

The epipolar constrained search is implemented on a thread of its own to produce per-frame 2D-2D correspondences. For current frame n, only 3D points that are validated against all frames 1 to n−1 are retained. Only persistent 3D points that survive for greater than L frames may be collected by the next keyframe.

The advantage of the above approach is that the system can construct long tracks, so when new 3D points are inserted, they are guaranteed to be accurate. To boost robustness, each 3D point is validated against all the frames in real-time, while prior systems could only do this in computational off-cycles.

If the application scenario involves scenes where the set of 3D points being viewed remains unchanged, then the pose module by itself would be sufficient to maintain the camera pose over extended periods. However, in outdoor applications like autonomous navigation, 3D scene points rapidly move out of view within a few frames. Thus, the stable set of points used for pose computation must be continually updated, which is the task entrusted to the epipolar search module.

FIG. 4 shows an exemplary local bundle module 103. The local bundle adjustment refines cameras and 3D points. Data structures are implemented to collect and refine 3D points from the epipolar thread.

To refine camera poses and 3D points incorporating information from multiple frames, the system implements a sliding window local bundle adjustment. The key data structure is the local bundle cache, which is composed of a frame cache and a match cache. The frame cache stores feature locations, descriptors and camera poses from the most recent N frames. It also stores images for those N frames, for display and debugging purposes. In the system, N=10. The match cache is a list of tables, one element corresponding to each frame. The key into the table is the identity of a 3D point visible in the frame and the stored entries are the identities of the corresponding 2D features in various frames.

The local bundle adjustment module also has other functions. After bundle adjustment, the system has a chance to re-find lost 3D points using the optimized pose. Since the system spends considerable effort in maintaining a high-quality set of 3D points for pose computation, it is worthwhile to incur a small overhead to recover any temporarily lost ones (due to image artifacts like blur, specularities or shadows). In fact, a stable 3D point is permanently discarded only when its projection using the current pose falls outside the image boundaries. Since the bundle adjusted pose is highly accurate, the system can perform re-finding by matching ORB descriptors on FAST corners within a very tight square of side $2r_f$ pixels (with $r_f$=10). This ensures re-finding is rapidly achieved within 1 ms.

One implementation uses the publicly available SBA package for bundle adjustment. In parallel, the motion model for predicting the pose of the next frame is also updated in this module. The timings for the parallel epipolar update and local bundle adjustment modules are summarized in Table 2.

TABLE 2

Epipolar update and local bundle timings in steady state (parallel modules)

| Module | Operation | Timing |
| --- | --- | --- |
| 2*Epipolar Update | Constrained search | 10-15 ms |
|  | Triangulation | 1-3 ms |
| 3*Local Bundle | Windowed bundle adjustment | 10-20 ms |
|  | Re-find 3D points | 1 ms |
|  | Update motion model | 0 ms |

Figure 6:
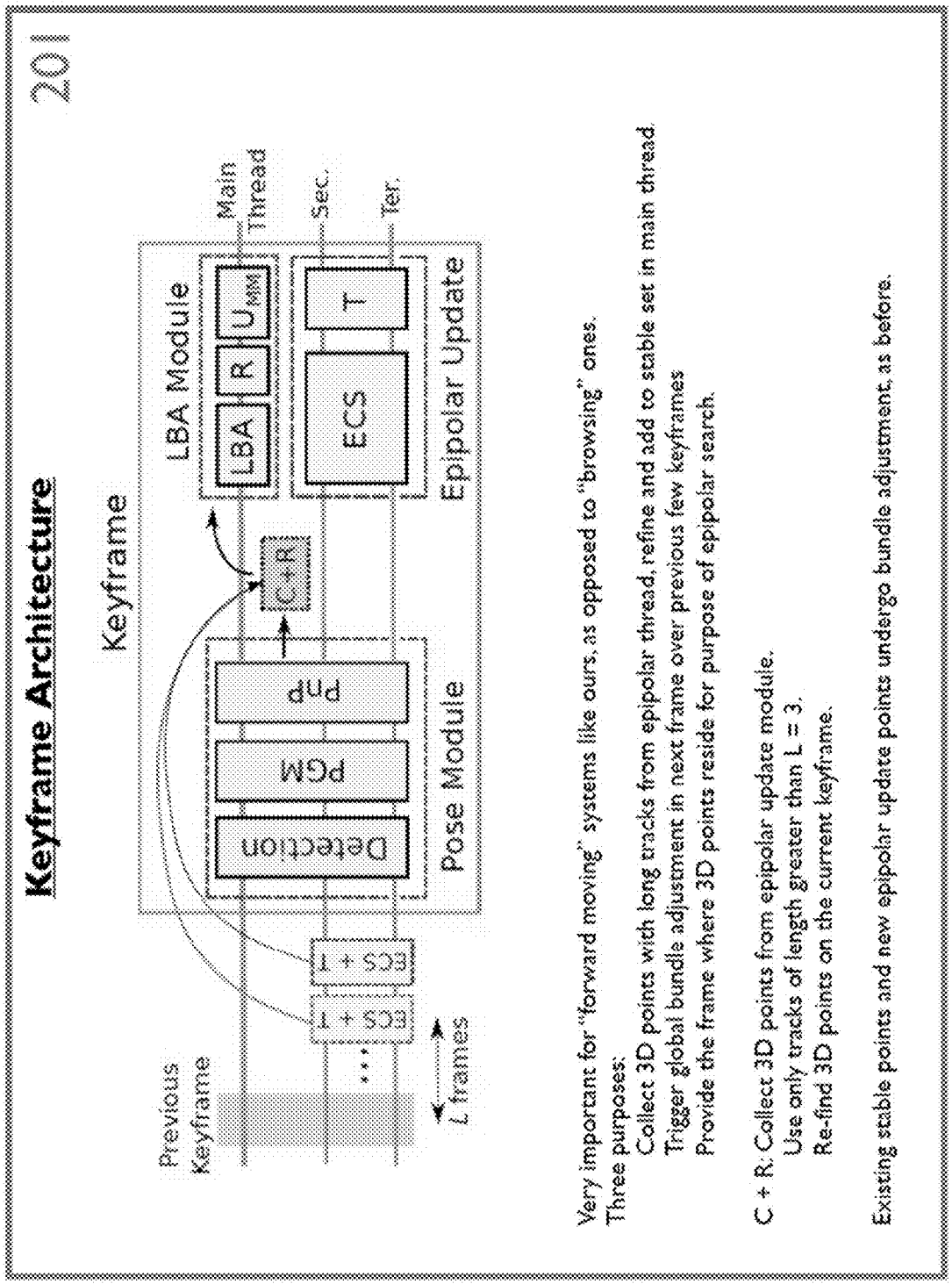
FIG. 6 shows an exemplary collection and refining module that allows bundle adjustment using long tracks.

FIG. 6 shows an exemplary multithreaded keyframe architecture 201 to handle insertion of new 3D points in the main thread. The system architecture for keyframes is similar to that of FIG. 1, with the addition of a collection and refinding module C+R. It collates persistent 3D points tracked over at least frames in the epipolar thread and re-finds them in the current frame using the output of the pose module. The LBA is now different from that for steady state, since its cache has been updated with 3D points and their corresponding 2D locations in all the relevant frames on the epipolar thread.

The system cannot maintain steady state indefinitely, since 3D points are gradually lost due to tracking failures or when they move out of the field of view. The latter is an important consideration in "forward moving" systems for autonomous driving (as opposed to "browsing" systems such as PTAM), so the role of keyframes is very important in keeping the system alive. The purpose of a keyframe is threefold:

Collect 3D points with long tracks from the epipolar thread, refine them with local bundle adjustment and add to the set of stable points in the main thread.

Trigger global bundle adjustment based on previous few keyframes that refines 3D points and keyframe poses.

Provide the frame where newly added 3D points "reside".

The modules that define operations at a keyframe are illustrated in FIG. 6. The pose module remains unchanged from the steady state. It is followed by a collection stage, where 3D points triangulated at each frame in the epipolar thread are gathered by the main thread. Only persistent 3D points that stem from features matched over at least L frames are collected (our circular matching for epipolar search ensures this is easily achieved by seeking 3D points only from at least L frames after the previous keyframe). Note that this mechanism imposes two necessary conditions for a point to be considered for inclusion into the stable set—it must be visible in at least two keyframes and must be tracked over at least L frames. While stringent, these conditions inherently enhance the chances that only reliable 3D points are added into the main thread. In the system, L=3 regardless of environment.

The collected 3D points must reside on a keyframe for all subsequent operations, so a re-finding operation is performed by projecting them using the estimated pose for the frame and finding the best ORB match in a circular region of radius 10 pixels. Now the existing stable 3D points, the collected 3D points from the epipolar thread, their projections in all the frames within the local bundle cache and the corresponding cameras undergo local bundle adjustment. The bundle adjustment at keyframes differs from steady state operation, but adding long tracks into the bundle adjustment at keyframes is a reason why the system can avoid more expensive multiview triangulation at each frame in the epipolar thread. The refined 3D points are now ready to be added to the stable set.

Figure 7:
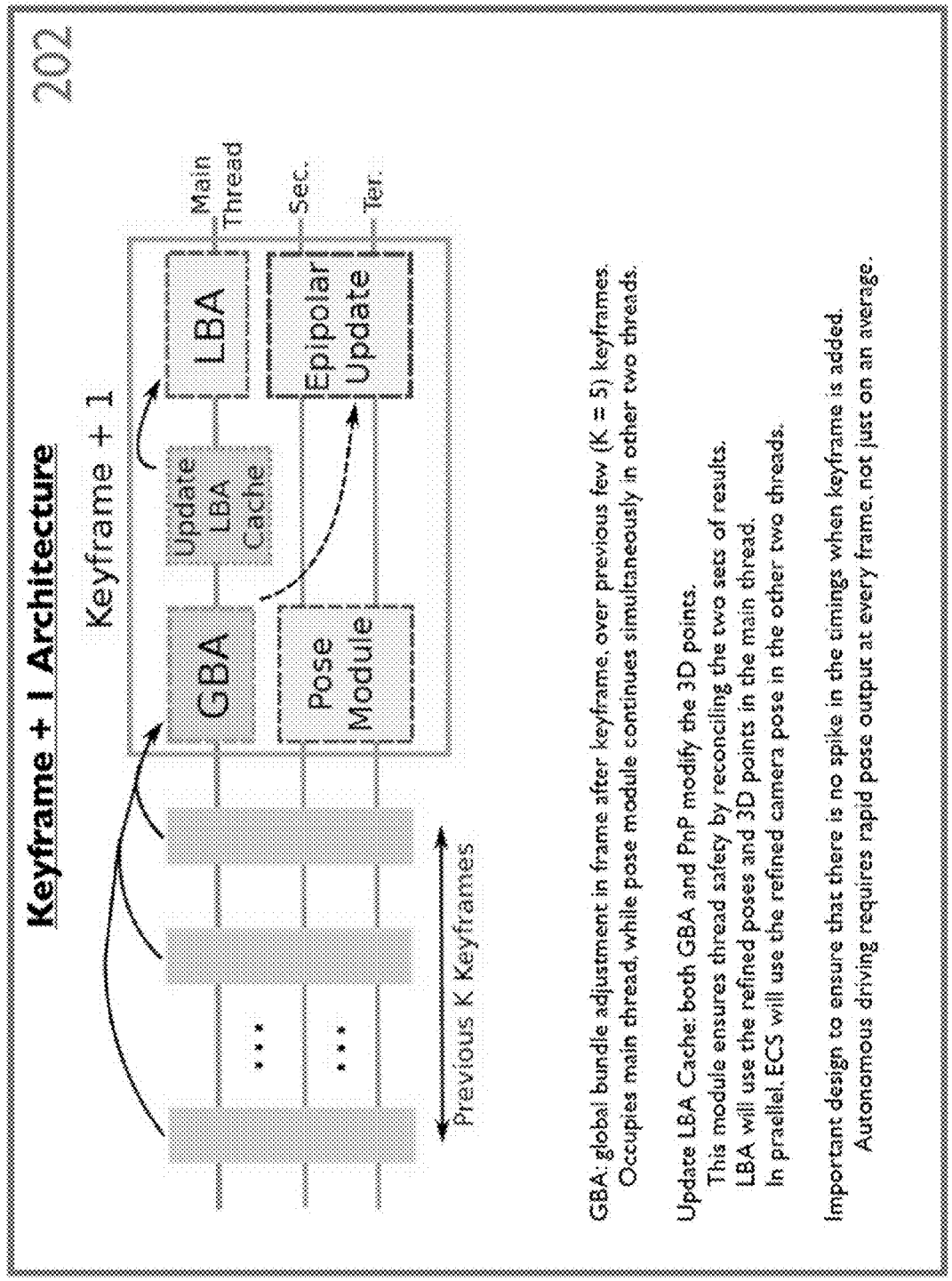
FIG. 7 shows an exemplary real-time global bundle adjustment module in a thread-safe architecture with real-time pose estimation.

The modules that define operations at the frame immediately after a keyframe are illustrated in FIG. 7. The pose module re-finds the (new) set of stable 3D points. The pose module is now split across only two threads, in order to accommodate a global bundle adjustment in the main thread. This bundle adjustment involves the previous K keyframes and their associated 3D points, in order to introduce long-range constraints to better optimize the newly added set of 3D points. For the system, choosing K=5 allows the global bundle adjustment to finish within 15 ms. There are two reasons a more expensive bundle adjustment involving a much larger set of previous keyframes (or even the whole map) is not necessary to refine 3D points with long-range constraints. First, the imagery in autonomous driving applications is fast moving and does not involve repetitions, so introducing more keyframes into the global bundle adjustment yields at best marginal benefits. Second, the goal is instantaneous pose output rather than map-building, so even keyframes are not afforded the luxury of delayed output. This is in contrast to parallel systems like where keyframes may produce a noticeable spike in the per-frame timings.

In FIG. 7, the previous K frames are provided to a GBA or global bundle adjustment unit. The GBA unit usually finishes within the time consumed by the pose module. The cache update module reconciles the 3D points modified by both PnP and GBA, before it is used by LBA. Following global bundle adjustment, the 3D coordinates of all the points are updated. Note that overlapping sets of 3D points are used by both global bundle adjustment and pose modules in parallel, however, both may also cause this set to change (PnP may reject 3D points that are outliers, while bundle adjustment may move the position of 3D points). To ensure thread safety, an update module is included that reconciles changes in the 3D point cloud from both the prior parallel modules. The local bundle adjustment module, which simply reads in 3D point identities, receives this updated set for optimization based on the N frames in the local bundle cache. In parallel with local bundle adjustment, the epipolar search also makes use of the updated keyframe pose. While the keyframe pose has seen a global bundle adjustment, the pose of the subsequent frame has not. This does not cause any inconsistency in practice since poses tend to be much more stable than points—a camera is constrained by hundreds of points, but a point is visible only in a few cameras. Thereafter, the system resumes steady-state operation until the next keyframe, unless a recovery or firewall condition is triggered. The following sections explain those concepts in detail.

Figure 8:
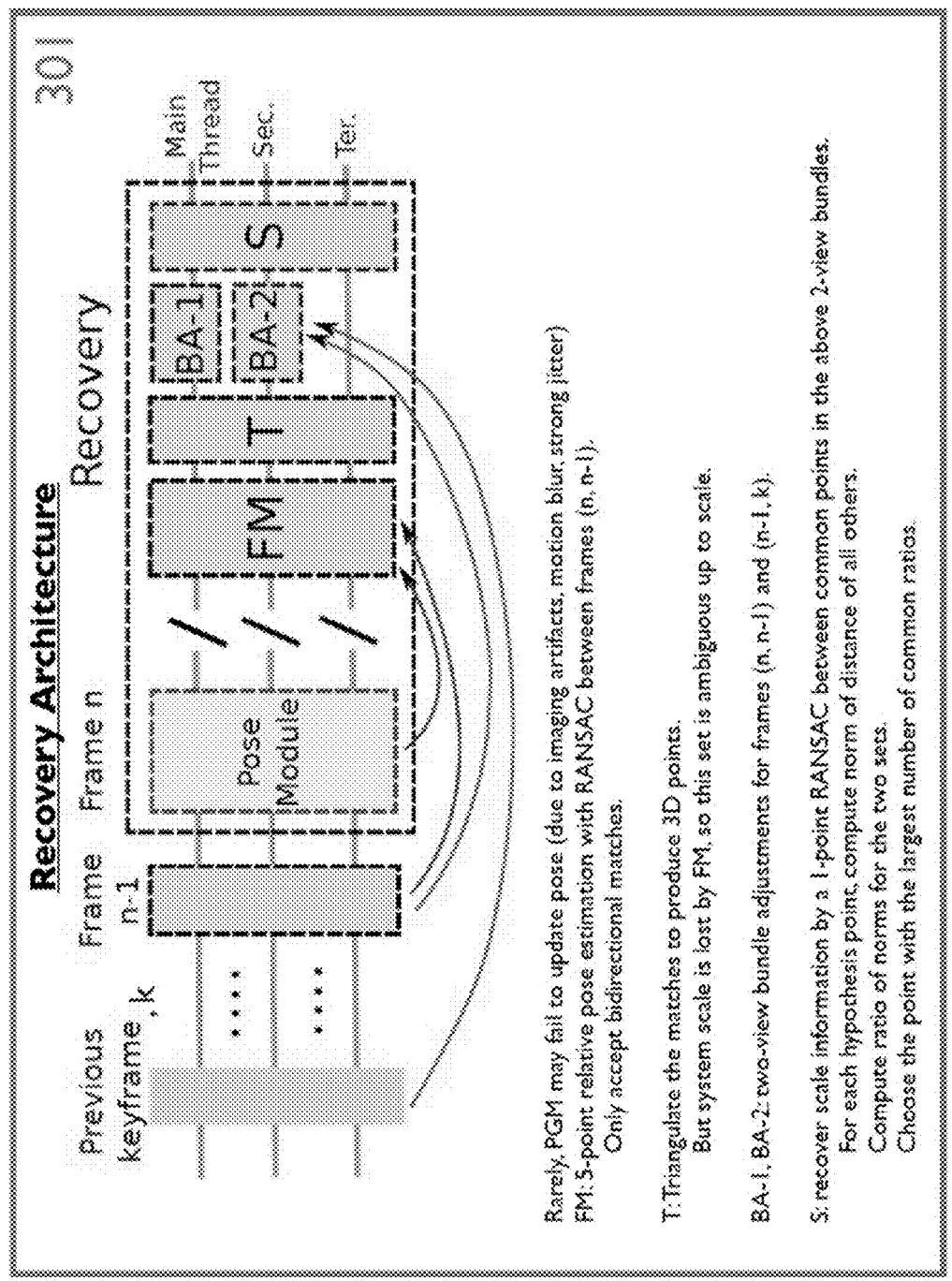
FIG. 8 shows an exemplary scale recovery process performed using a 1-point RANSAC between 3D points reconstructed before and after the tracking failure.

FIG. 8 shows an exemplary system architecture for a recovery frame. Data from the pose module is sent to feature matching (FM), triangulation (T) and then sent to BA-1 and BA-2 for bundle adjustments. The data from triangulation and bundle adjustments are then sent to S unit for scale recovery.

On occasions, the system might encounter a frame where pose-guided matching fails to find any features (due to imaging artifacts or a sudden large motion). In such a situation, a recovery mode is triggered, as illustrated in FIG. 8. In this case, the frame where system recovery initiates is n and k can be the immediately preceding keyframe. During recovery, the frames (n, n−1) are matched by comparing ORB descriptors over the entire image using fast LSH and accepting only bidirectional matches. Relative pose is computed using the 5-point algorithm in a robust RANSAC framework and inlier matches are triangulated. However, scale information is lost in the process. So, the system considers 3D points observed between frames (n−1, k). Both the sets of 3D points are moved to the coordinate system of frame n−1 and a 1-point RANSAC is performed. The hypothesis for the RANSAC is the ratio of the norms of the sampled 3D point in the two sets. The corrected scale factor between frames (n, n−1) is assigned as the average ratio in the largest consensus set. To ensure that 3D points used for scale recovery are as accurate as possible, two instances of bundle adjustments are run in parallel—one between frames (n, n−1) and another between frames (n−1, k).

The system is designed to keep repeating the recovery mechanism until a stable set of 3D points is found. In the experiments, the system always recovers a stable set of 3D points after only one frame of recovery. For sequences in the KITTI dataset, recovery is required on an average once in 1500 frames. In one embodiment of unit 301, scale recovery is performed using a 1-point RANSAC between 3D points reconstructed before and after the tracking failure.

FIG. 9 shows an exemplary scale correcting unit 302 that combines scale estimates from 3D points and planar homography mappings. Scale drift can be a significant problem in monocular visual odometry. Using global knowledge of the trajectory for scale correction, such as loop closure, is not an option for practical autonomous driving applications. Instead, the system uses the fact that the camera is mounted a fixed height above the road plane. Unlike prior methods, the system is accurate enough to be able to hold scale for extended periods, so while the system computes scale against the ground at every frame, the scale correction mechanism is triggered sparingly. The system automatically determines when scale correction may be required—in practice, once in approximately 100 frames. Not requiring per-frame scale correction also ensures that the system is able to tide over regions where the road surface may not be planar.

The scale detection is implemented in a separate thread. At every frame, the system considers a small region of interest closest to the car (mid-section of the lower half of the image). Features within this region that can be matched to the previous frame are triangulated. This narrow baseline is used since matching is harder on low-textured roads and the features in this region of interest rapidly move out of the field of view. A 3-point RANSAC is used to find the best-fitting plane to these triangulated points and the distance of the plane to the camera is computed as $h_1$. If the known height of the camera mounting is $h_0$, the scale correction factor is $$s_1 = \frac{h_0}{h_1}.$$

The system computes the planar homography between the set of road points in the two frames, using a 4-point RANSAC where hypotheses are generated by linear estimation of algebraic error. This is followed by Levenberg-Marquardt based nonlinear optimization of the optimal symmetric reprojection error over the largest consensus set:

$$\min_H \sum_i \|x_i' - Hx_i\|^2 + \|x_i - H^{-1}x_i'\|^2, \quad (1)$$

where H is the planar homography that maps homogeneous inlier point set x in the previous frame to the corresponding set x' in the current frame. The form of the homography H is:

$$H = R + \frac{1}{h_2} tn^T, \quad (2)$$

where (R, t) is the relative pose, n is the unit normal of the proposed ground plane and $h_2$ is the distance of the plane from the camera. The height $h_2$ may be recovered from H using a singular value decomposition of $H^TH$. Again, the scale factor may be computed as the ratio $$s_2 = \frac{h_0}{h_2}.$$

Having computed $s_1$ and $s_2$ at current frame k, the system compares their values and consider them in mutual agreement when they differ by less than 5%. When in mutual agreement, it is likely that the points in consideration actually belong to a planar ground and a potential scale factor, $s_k$=mean($s_1,s_2$), is available. If $|s_k-1|>0.1$, the system polls for scale correction. First, it seeks to confirm the computed scale $s_k$ by verifying that the previous mutually agreed scale factor was within 5% of $s_k$. If not, it waits for the next mutually agreed scale factor to confirm $s_k$. Once confirmed, the system inserts a firewall whereby the 3D points and camera poses in the bundle cache are scale corrected. The frames preceding the bundle cache are now fixed and play no further part in future estimation (in effect, their data structures are emptied). The ground detection and firewall estimation require about 30 ms.

The multithreaded system enables large-scale, real-time, monocular visual odometry, targeted towards autonomous driving applications with fast-changing imagery. The multithreaded design can boost both the speed and accuracy for handling challenging road conditions. The system is optimized to provide pose output in real-time at every frame, without delays for keyframe insertion or global bundle adjustment. This is achieved through a per-frame epipolar search mechanism that generates redundantly validated 3D points persistent across long tracks and an efficient keyframe architecture to perform online thread-safe global bundle adjustment in parallel with pose computation. Further, the system is accurate enough to require only occasional scale correction, for which an automatic mechanism is provided that detects planarity of the ground to compute reliable scale factors. Multithreaded bundle adjustment can be optimized for small-sized problems that arise in autonomous driving applications. Real-time detection of pedestrians and cars can also be done for better handling of crowded scenes.

What is claimed is:

1. A method for multithreaded visual odometry, comprising acquiring images with a single camera on-board a vehicle;
using 2D-3D correspondences for continuous pose estimation with a pose local bundle adjustment (LBA) system including a feature matching engine using three or more parallel CPU threads with pose estimation across all threads, followed by local bundle adjustment in the primary thread;
using a local bundle cache including a frame cache and a match cache, wherein the frame cache stores feature locations, descriptors and camera poses from most recent frames and images, wherein the match cache comprises a list of tables, one element corresponding to each frame with a key into the table being an identity of a 3D point visible in the frame and stored entries are identities of corresponding 2D features in the frames;
combining the pose estimation with 2D-2D epipolar search to replenish 3D points; and
generating structure-from-motion (SFM).

2. The method of claim 1, comprising using the visual odometry for autonomous driving applications.

3. The method of claim 1, comprising pose-guided matching to provide fast 3D-2D correspondences.

4. The method of claim 1, comprising performing epipolar constrained search to produce per-frame 2D-2D correspondences.

5. The method of claim 4, comprising constructing long tracks, and inserting new 3D points guaranteed to be accurate.

6. The method of claim 1, comprising validating each 3D point against all frames in real-time.

7. The method of claim 1, comprising performing local bundle adjustment to refine cameras and 3D points.

8. The method of claim 7, comprising collecting and refining 3D points from an epipolar thread.

9. The method of claim 1, comprising inserting new 3D points in a main thread.

10. The method of claim 1, comprising collecting and refinding mechanism allows bundle adjustment using long tracks.

11. The method of claim 1, comprising performing real-time global bundle adjustment in a thread-safe architecture with real-time pose estimation.

12. The method of claim 1, comprising handling failures due to tracking or scale drift.

13. The method of claim 1, comprising using a 1-point RANSAC between 3D points reconstructed before and after a tracking failure.

14. The method of claim 1, comprising scale correcting by combining scale estimates from 3D points and planar homography mappings.

15. The method of claim 1, comprising planar homography between a set of road points in two frames, using a 4-point RANSAC where hypotheses are generated by linear estimation of algebraic error and followed by Levenberg-Marquardt based nonlinear optimization of the optimal symmetric reprojection error over a largest consensus set:

$$\min_H \sum_i \|x_i' - Hx_i\|^2 + \|x_i - H^{-1}x_i'\|^2,$$

where H is a planar homography that maps homogeneous inlier point set x in a previous frame to a corresponding set x' in a current frame, where a form of a homography H is:

$$H = R + \frac{1}{h_2}tn^T,$$

where (R, t) is a relative pose, n is a unit normal of a proposed ground plane and $h_2$ is a distance of a plane from a camera and height $h_2$ is recovered from H using a singular value decomposition of $H^T H$ and a scale factor computed as a ratio $$s_2 = \frac{h_0}{h_2}.$$

16. A system for multithreaded visual odometry, comprising:
- a single camera on-board a vehicle; and
- a multi-threaded processor coupled to the camera, the multi-threaded processor using 2D-3D correspondences for continuous pose estimation with a pose local bundle adjustment (LBA) system including a feature matching engine using three or more parallel CPU threads with pose estimation across all threads, followed by local bundle adjustment in the primary thread;
- a local bundle cache including a frame cache and a match cache, wherein the frame cache stores feature locations, descriptors and camera poses from most recent frames and images, wherein the match cache comprises a list of tables, one element corresponding to each frame with a key into the table being an identity of a 3D point visible in the frame and stored entries are identities of corresponding 2D features in the frames;
- combining the pose estimation with 2D-2D epipolar search to replenish 3D points.

17. The system of claim 16, comprising code for autonomous driving applications using the visual odometry.

18. The system of claim 16, comprising code for pose-guided matching to provide fast 3D-2D correspondences.

19. The system of claim 16, comprising code to perform epipolar constrained search to produce per-frame 2D-2D correspondences.

20. The system of claim 19, comprising code for constructing long tracks, and inserting new 3D points guaranteed to be accurate.

* * * * *